(12) United States Patent
Wright et al.

(10) Patent No.: US 6,182,452 B1
(45) Date of Patent: Feb. 6, 2001

(54) METHOD AND DEVICE FOR COOLING AND ENHANCING THE FLAVOR OF BEVERAGES

(75) Inventors: Monique P. Wright; Christopher O. Wright, both of Naples, FL (US)

(73) Assignees: Tamara A. Wright; Anthony J. Wright, both of Naples, FL (US)

( * ) Notice: Under 35 U.S.C. 154(b), the term of this patent shall be extended for 0 days.

(21) Appl. No.: 09/303,516

(22) Filed: May 3, 1999

(51) Int. Cl.[7] .............................. F25D 3/08; C12C 7/26; A23L 3/36
(52) U.S. Cl. ................................ 62/1; 62/530; 426/524
(58) Field of Search ..................... 62/1, 530, 457.2; 426/66, 373, 410, 515, 524

(56) References Cited

U.S. PATENT DOCUMENTS

| | | | |
|---|---|---|---|
| 1,923,522 | 8/1933 | Whitehouse | 62/1 |
| 2,036,706 * | 4/1936 | Law | 426/515 |
| 2,285,149 | 6/1942 | D'Arcey | 62/172 |
| 2,370,931 * | 3/1945 | Bogin et al. | 62/457.2 |
| 2,550,633 * | 4/1951 | Zalkind | 62/530 |
| 2,975,925 * | 3/1961 | Chambers | 426/515 |
| 4,091,632 * | 5/1978 | Marchewka et al. | 62/1 |
| 4,285,490 * | 8/1981 | Hanley | 249/92 |
| 4,350,712 | 9/1982 | Kocharian et al. | 426/134 |
| 4,735,063 | 4/1988 | Brown | 62/293 |
| 4,765,147 | 8/1988 | Adachi | 62/62 |
| 4,790,999 | 12/1988 | Ashmont et al. | 426/592 |
| 5,013,562 | 5/1991 | Somura | 426/66 |
| 5,296,251 | 3/1994 | Ishida et al. | 426/592 |
| 5,958,481 * | 9/1999 | Hodges | 426/100 |

* cited by examiner

*Primary Examiner*—William Doerrler
(74) *Attorney, Agent, or Firm*—Edward M. Livingston, Esq.

(57) ABSTRACT

A sealed package (1, 7) containing the beverage placed in a frozen state (2, 8) capable of being easily opened to allow the frozen beverage (2, 8) to be inserted into a container (5) containing the same beverage in a liquid state. The package (1, 7) would preferably be a cylindrically shaped packet made of plastic with serrations (3, 9) for opening. The beverage in the packages, such as beer, could be in a concentrated form to further enhance the intensity of the beverage or even may be flavored to modify the beverage at the same time it is cooled. The packets (1, 7) could be sized to fit into an opening of a conventional beverage can (6), bottle or pitchers containing the beverage.

20 Claims, 1 Drawing Sheet

METHOD AND DEVICE FOR COOLING AND ENHANCING THE FLAVOR OF BEVERAGES

BACKGROUND OF THE INVENTION

This invention relates to devices used to cool beverages and more particularly to a frozen beverage stored in plastic packets until needed for use to cool beverages without dilution and at the same time to enhance or modify the flavor of a beverage.

Normally, when one desires to cool or maintain a beverage in a cool state for drinking one must put ice cubes into it which dilutes the beverage and adversely affects its flavor. The latter is particularly a problem in the case when the beverage is beer. Some restaurants use ice in plastic bags or support a container having ice to the sides of a pitcher containing beer. However, the latter method is somewhat unsanitary and makes it difficult to pour the beer into glasses for drinking. Also, if one wants to drink a beverage stored in an ambient condition if the beverage is not already cool, one must refrigerate it for a period of time until it is cool enough to drink. In addition to cooling a beverage such as beer, some persons want to enhance the flavor of a beverage by adding a concentrated version of the beverage or modify the flavor slightly, such as adding "honey wheat" to regular beer, while cooling.

Thus, a need exists for a method and device for cooling beer and also enhancing or modifying the flavor at the same time.

The prior art includes many patents related to freezing devices and methods, but none like the present invention. For instance, U.S. Pat. No. 1,923,522 issued to Whitehouse on Aug. 22, 1933, discloses a cooling device having water which is frozen in a container and placed in the drink. However, use of such a cooling device can still result in contamination and does not enhance the flavor of the beverage. U.S. Pat. No. 4,735,063 issued to Brown on Apr. 5, 1988, discloses a cooling rod. U.S. Pat. No. 2,285,149 issued to D'arcey on Jun. 2, 1942, discloses a beverage cooling device having a plurality of cooling sticks attached together to be stirred in a beverage to cool it. U.S. Pat. No. 4,350,712 issued to Kocharian, et al. on Sep. 21, 1982, discloses a frozen popsicle made of beer or wine. U.S. Pat. No. 4,765,147, issued to Adachi on Aug. 23, 1988, discloses a method for freezing sake. U.S. Pat. No. 4,790,999 issued to Ashmont, et al. on Dec. 13, 1988, discloses an alcoholic soft ice for creating a frozen cocktail. U.S. Pat. No. 5,013,562 issued to Somura on May 7, 1991, discloses liquor encased in a lump of ice for drinking. Finally, U.S. Pat. No. 5,296,251 issued to Ishida, et al. on Mar. 22, 1994, discloses liquors which freeze into a sherbet when poured into a container.

Although there are many patents which involve freezing beer and alcohol, none discloses a method and device for cooling beverages and enhancing or modifying the flavor of those beverages in a manner taught by this invention.

SUMMARY OF THE INVENTION

The present invention provides a device and method that has the following objects:

to cool beverages without diluting the flavor of the beverage;
to cool the beverage without contamination;
to enhance the flavor of the beverage;
to also modify the flavor of the beverage if desired;
to eliminate the need to refrigerate the beverage;
to eliminate delay in waiting until the beverage is cool enough for drinking; and
to prevent waste when beverage becomes too warm to drink.

The present invention accomplishes the above and other objects by providing a sealed package storing the beverage for use when in a frozen state which can be opened to release the frozen beverage into a container without dilution for drinking. The package may be a packet made of plastic which is serrated along either or both the top or bottom for easy tearing. The frozen beverage contained in the packet could be almost any beverage and could include beer, which may be in concentrated form or even flavored. The packets may be cylindrical in shape and sized to fit through and into the standard opening of a beverage can.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENT

Figure 1:
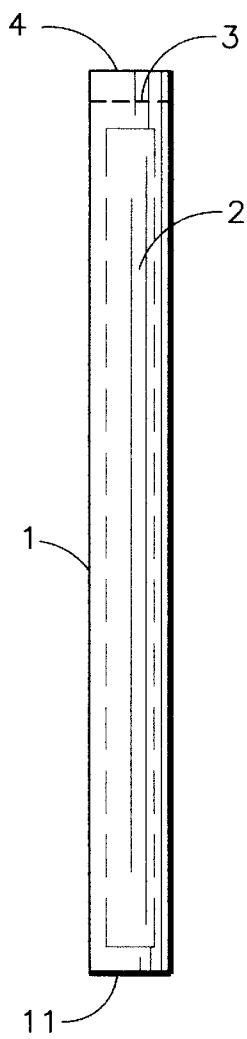
FIG. 1 is a side view of a device of the present invention in the form of a thin packet usable with beverage cans.

For purposes of describing the preferred embodiment, the terminology used in reference to the numbered components in the drawings is as follows:

| | |
|---|---|
| 1. packet | 7. large packet |
| 2. frozen beverage | 8. frozen beverage |
| 3. serrated opening means | 9. serrated opening means |
| 4. top of packet | 10. top of large packet |
| 5. beverage can | 11. bottom of small packet |
| 6. can opening | 12. bottom of large packet |

Figure 2:
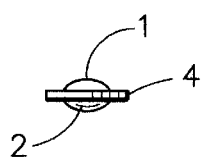
FIG. 2 is a top view of the device of FIG. 1.

Referring now to the drawings, FIGS. 1 and 2 shows the device of the present invention in the form of a packet 1, preferably made of plastic, but could be made of foil, which contains the beverage 2 in frozen form for use. The packet 1 is sealed, including at the bottom 11 and top 4. A serrated opening line 3 appears near the top 4 of the packet 1 so that it may be torn off to allow the frozen beverage stick 2 to be easily slid out of and inserted into a container containing liquid beverage. The serrated opening 3 may also be placed near the bottom 11 so that either top or bottom may be torn.

Figure 3:
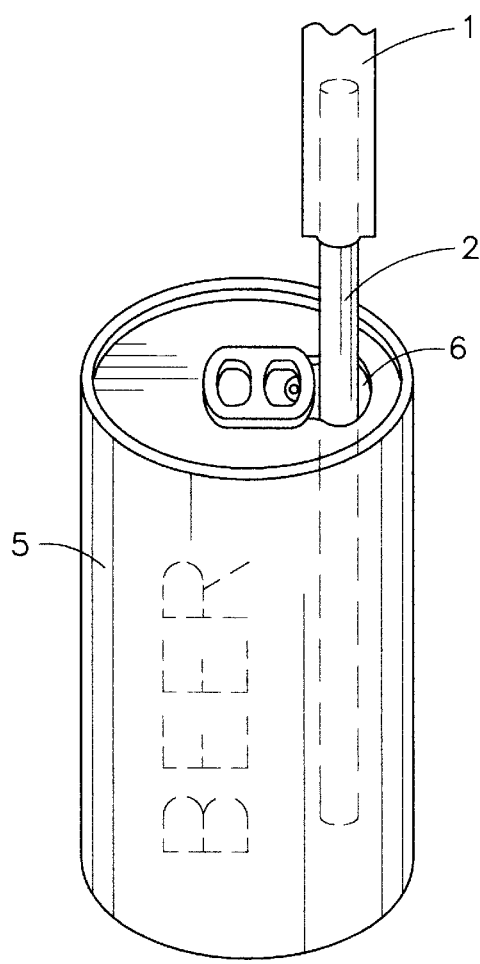
FIG. 3 is a side perspective plan view of FIG. 1 showing the frozen contents of the packet being placed through and into the opening of a beer can.

FIG. 3 shows the packet 1 of FIG. 1 in partial view with the frozen beverage 2 being inserted through an opening 6 into a beverage can 5 to cool it and enhance the flavor of the beverage prior to drinking.

Figure 4:
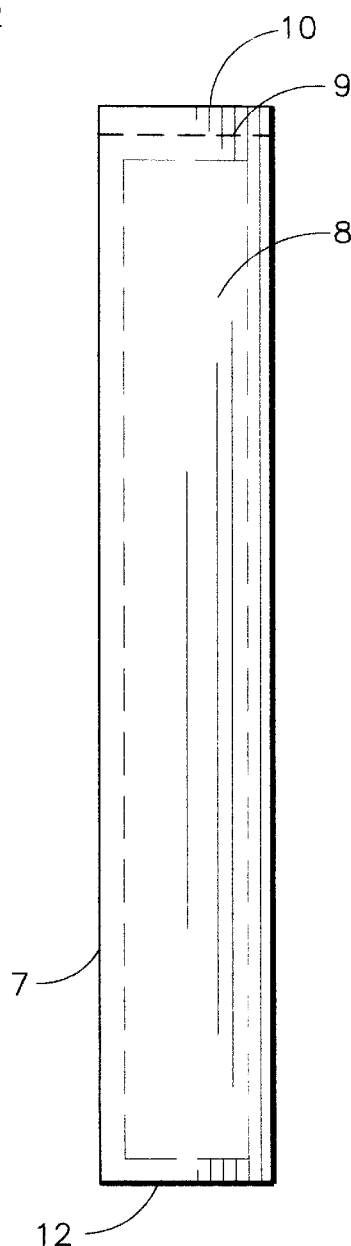
FIG. 4 is a side view of a device of the present invention in a larger packet form for use in a large container, such as a pitcher, containing the beverage to be cooled.

Finally, FIG. 4 shows a device of the present invention in a larger packet form 7 for use in a larger container of liquid beverage, such as a pitcher of beer. The packet 7 contains the beverage 8 in a frozen state or a concentrated version thereof and could be opened at the top 10 by a serrated line 9 or another serrated line (not shown) at the bottom 12.

The device of the present invention preferably would be contained in a plastic packet, similar to that used for children's popsicles. Such packaging would allow the beverage contained therein, such as beer, to be shelved in a liquid state and then frozen until needed. The packets of beverage would preferably be in a cylindrical shape approximately 4½ inches in length and ¾ inch in diameter, thereby allowing it to fit into the opening of beer cans, bottles and drinking glasses. The packets could be available in several "alcoholic" contents, non-alcoholic, low or high alcohol. The packets could contain the beverage specific to a particular brand of beer in order not to alter the contents or flavor of the beer. Alternatively, the packets could contain various flavors to enhance or modify the flavor of the beer, such as flavoring the ordinary beer to have a "honey wheat" flavor.

Although the beverage in the packets may be frozen as is, one or more additives might be added to the beverage to allow it to solidify better or remain in the frozen state longer while frozen. In addition to the package being cylindrically shaped, it could also be changed for holidays or special events to include such things as Christmas trees, footballs, baseball bats, race cars and so forth.

Thus, as disclosed the present invention would keep a beverage cold for a longer period of time without "watering-down" the flavor. The present invention would be a vast improvement over current methods of cooling beverages, including insulated "huggers," freezing drinking glasses or using bags of ice.

Although only a few embodiments of the present invention have been described in detail hereinabove, all improvements and modifications to this invention within the scope or equivalents of the claims are included as part of this invention.

Having thus described our invention, we claim:

1. A device for cooling and enhancing the flavor of a beverage comprising:
    a sealed packet containing the beverage for placing the beverage into a frozen state; and
    means for opening the packet to release the beverage in the frozen state into a container holding the beverage in a liquid state to cool the beverage in the liquid state for drinking.

2. The device of claim 1 wherein the sealed packet is made of plastic.

3. The device of claim 2 wherein the means for opening the package is a serration along at least one of a top or bottom of the package for easy tearing.

4. The device of claim 1 wherein the frozen beverage is beer.

5. The device of claim 2 wherein the frozen beverage is beer.

6. The device of claim 3 wherein the frozen beverage is beer.

7. The device of claim 1 wherein the beverage in a frozen state is a concentrated form of the beverage.

8. The device of claim 4 wherein the beverage in a frozen state is a concentrated form of the beverage.

9. The device of claim 1 wherein the beverage in the frozen state is flavored.

10. The device of claim 4 wherein the beverage in the frozen state is flavored.

11. The device of claim 7 wherein the beverage in the frozen state is flavored.

12. The device of claim 8 wherein the beverage in the frozen state is flavored.

13. The device of claim 2 wherein packet is approximately cylindrical in shape.

14. The device of claim 13 wherein the packet is sized to fit through and into an opening in a conventional beverage container.

15. A method of cooling and enhancing flavor of a beverage using a sealed packet containing the beverage comprising the steps of:
    freezing the package until the beverage is in a frozen state;
    opening the packet to expose the frozen beverage; and
    placing the frozen beverage into a container containing the beverage in a liquid state to cool the beverage in the liquid state for drinking.

16. The method of claim 15 wherein the beverage is beer.

17. The method of claim 15 wherein the beverage in a frozen state is concentrated so it further enhances the flavor during use.

18. The method of claim 15 wherein the frozen beverage is flavored differently from that of the beverage.

19. The device of claim 1 wherein the beverage in the sealed packet to be frozen contains flavor-altering agents.

20. The device of claim 1 wherein the beverage in the sealed packet to be frozen contains additives to enhance frozen state properties of the beverage.

* * * * *